United States Patent Office.

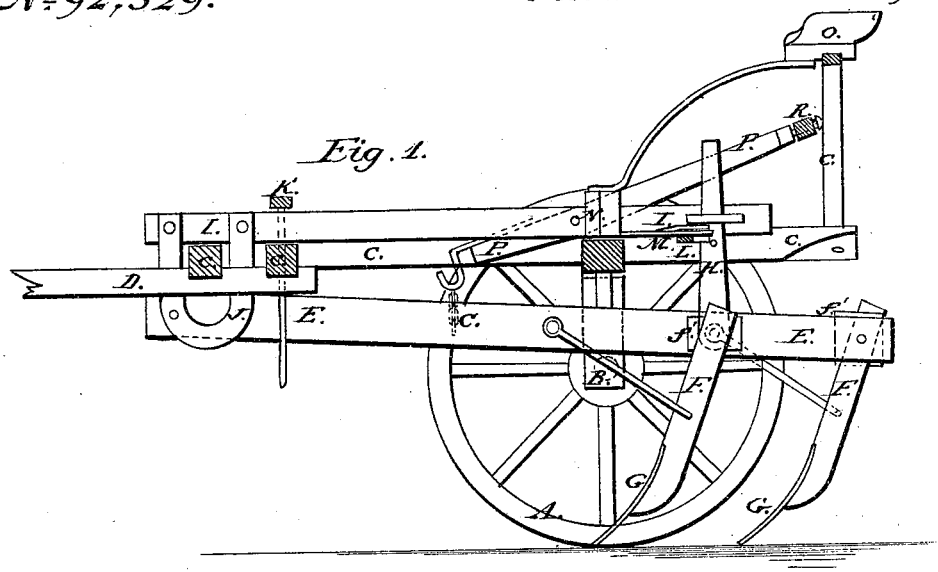
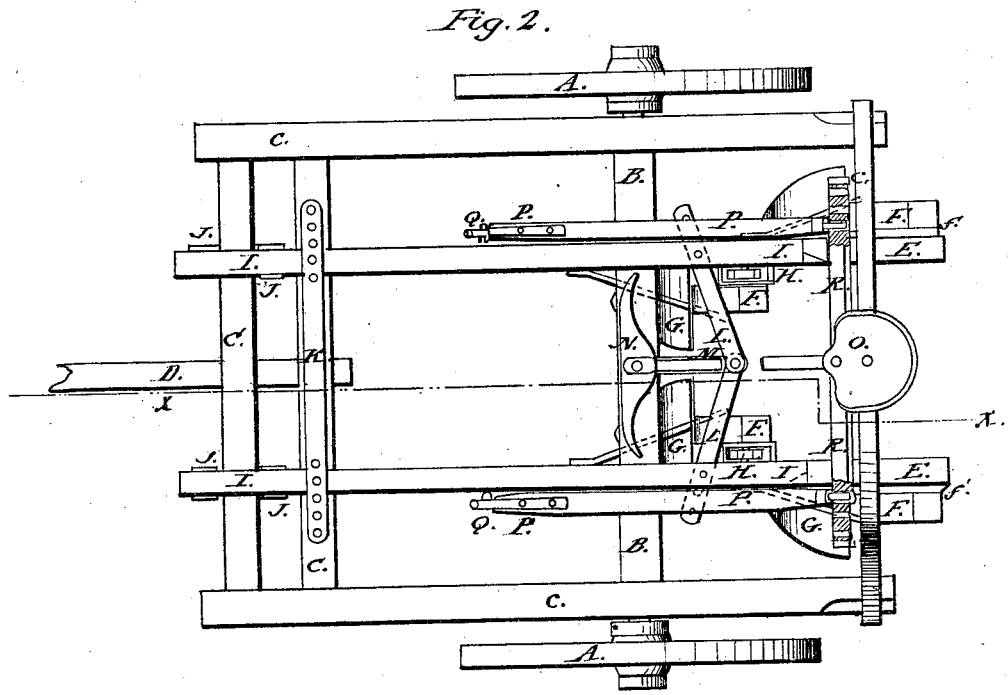

ISAIAH HENTON, OF SHELBYVILLE, ILLINOIS.

Letters Patent No. 92,529, dated July 13, 1869.

IMPROVEMENT IN CULTIVATORS.

The Schedule referred to in these Letters Patent and making part of the same.

*To all whom it may concern:*

Be it known that I, ISAIAH HENTON, of Shelbyville, in the county of Shelby, and State of Illinois, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved machine, taken through the line $x\ x$, fig. 2.

Figure 2 is a top or plan view of the same, parts being broken away to show the construction.

Similar letters of reference indicate like parts.

My invention has for its object to improve the construction of my improved cultivator, patented March 6, 1866, numbered 52,998, so as to make it more convenient, satisfactory, and efficient in operation; and It consists in the construction and combination of various parts, as hereinafter more fully described.

A are the wheels, and

B is the axle of the cultivator.

C is the frame, which is rigidly attached to the axles B, and to the forward part of which the tongue D is attached.

E are the plow-beams, to the rear parts of which are secured the standards F, to which the plows G are attached.

$f$ are wedge-shaped blocks interposed between the standards F and beams E, so that by turning the said blocks half around, the plows may be so adjusted as to throw the dirt towards or from the hill, as may be desired.

To the rear part of the beams E are attached uprights H, which pass up through keepers attached to the pivoted bars or frame I, so that the beams E may be made to move up and down vertically, and be carried with the said bars or frame I, as they are vibrated upon their pivoting points.

The forward ends of the beams E are connected to the forward ends of the bars I by the curved bars, stirrups, or plates J, the upper parts of which are securely attached to the forward ends of the said bars I, and to the lower parts of which the forward ends of the plow-beams E are pivoted, so that the rear ends of said beams E may be free to move vertically, independently of the bars I, but can only move laterally in connection with the said rear ends of the said bars I.

The forward parts of the bars I are pivoted to the forward part of the frame C by bolts, and they are also connected to each other by the adjustable bar K.

The rear parts of the bars or frame I rest upon the axle B, or upon a cross-bar of the frame C.

L are adjustable connecting-bars, the outer ends of which are pivoted to the rear part of the bars I, and the inner ends of which are pivoted to the end of the arm M, the other end of which is rigidly attached to or formed solidly upon the foot-lever N.

The foot-lever N is pivoted at its middle part to the middle part of the axle B, as shown in fig. 1.

O is the driver's seat, which is supported from the frame C in such a position that the driver's feet may rest upon the ends of the foot-lever N, so that by pressing upon said lever with one or the other of his feet, the driver may move the plow-beams and plows to one side or the other, to avoid irregular hills or obstructions when operating the machine.

P are levers pivoted to the outer sides of the pivoted bars I, and the forward ends of which are connected with the plow-beams E by short chains Q, the lower ends of which are secured to the said beams E, and the upper ends of which hook upon hooks attached to or formed upon the ends of the levers P.

The rear ends of the levers P are adjustably pivoted to the ends of the cross-bar R, as shown in figs. 1 and 2.

By this construction, the driver, by bearing down upon the cross-bar R, with one or the other foot, or with both feet, can conveniently raise either or both plow-beams as he may desire, for convenience in passing over obstructions, turning around, or passing from place to place.

Having thus described my invention,

I claim as new, and desire to secure by Letters Patent—

1. The combination of the pivoted levers P, pivoted cross-bar R, and chains Q with each other, and with the pivoted-bars I and plow-beams, E, substantially as herein shown and described, and for the purpose set forth.

ISAIAH HENTON.

Witnesses:
ANDREW L. BARRICKMAN,
MARSHALL HOWARD.